(12) United States Patent
Abbas

(10) Patent No.: US 12,541,748 B2
(45) Date of Patent: *Feb. 3, 2026

(54) SYSTEM AND METHOD FOR PROVIDING REAL-TIME UPDATES OF CHEQUE COLLECTION IN A CHEQUE CLEARING PROCESS

(71) Applicant: The Toronto-Dominion Bank, Toronto (CA)

(72) Inventor: Mohamed Abbas, Jersey City, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,027

(22) Filed: Dec. 10, 2024

(65) Prior Publication Data

US 2025/0104024 A1    Mar. 27, 2025

Related U.S. Application Data

(63) Continuation of application No. 18/328,052, filed on Jun. 2, 2023, now Pat. No. 12,198,109.

(51) Int. Cl.
G06Q 20/04 (2012.01)
G06Q 20/40 (2012.01)

(52) U.S. Cl.
CPC ....... *G06Q 20/042* (2013.01); *G06Q 20/4014* (2013.01)

(58) Field of Classification Search
CPC .................. G06Q 20/042; G06Q 20/0425
USPC .............................................. 235/379; 705/45
See application file for complete search history.

(56) References Cited

U.S. PATENT DOCUMENTS

| | | | |
|---|---|---|---|
| 6,754,640 B2 | 6/2004 | Bozeman | |
| 7,720,735 B2 | 5/2010 | Anderson et al. | |
| 8,626,661 B2 | 1/2014 | Gilder | |
| 8,959,033 B1 | 2/2015 | Oakes, III et al. | |
| 10,210,522 B1 | 2/2019 | Medina, III et al. | |
| 11,200,550 B1 | 12/2021 | Singfield | |
| 11,615,491 B2 | 3/2023 | Cook | |
| 12,198,109 B2 * | 1/2025 | Abbas | G06Q 20/042 |
| 2006/0106717 A1 | 5/2006 | Randle et al. | |
| 2008/0086421 A1 | 4/2008 | Gilder et al. | |
| 2014/0330708 A1 | 11/2014 | Felse et al. | |
| 2014/0330714 A1 | 11/2014 | Felse et al. | |

FOREIGN PATENT DOCUMENTS

IN        201621040018        1/2019

\* cited by examiner

*Primary Examiner* — Suezu Ellis
(74) *Attorney, Agent, or Firm* — Rowand LLP

(57) ABSTRACT

A server computer system includes a communications module; at least one processor coupled to the communications module; and a memory coupled to the at least one processor, the memory storing processor-executable instructions which, when executed by the at least one processor, configure the at least one processor to receive, via the communications module, an indication that a cheque clearing process has been initiated for a cheque; obtain an account number and a routing number for the cheque; perform a lookup to identify a payor of the cheque; and send, via the communications module and to a client device associated with the payor of the cheque, a real-time update indicating that the cheque has been submitted for collection.

35 Claims, 15 Drawing Sheets

700

Send an interface that includes a representation of a series of cheque clearing operations for the cheque clearing process and identifies one of the cheque clearing operations as a current cheque clearing operation, the representation of the current cheque clearing operation selectable to input a processing command causing the server computer system to send an electronic message to a system performing the current cheque clearing operation, the electronic message including a request for further details about the current cheque clearing operation

710

Determine, in real-time or near real-time, that the current cheque clearing operation has completed

720

Enable, in real-time or near real-time, the representation of a next current cheque clearing operation as being selectable to input a processing command causing the server computer system to send an electronic message to a system performing the next current cheque clearing operation

SYSTEM AND METHOD FOR PROVIDING REAL-TIME UPDATES OF CHEQUE COLLECTION IN A CHEQUE CLEARING PROCESS

CROSS-REFERENCE TO RELATED APPLICATIONS

This application is a continuation of U.S. patent application Ser. No. 18/328,052, filed Jun. 2, 2023, the entire contents of which are incorporated herein by reference.

TECHNICAL FIELD

The present application relates to systems and methods for providing real-time updates of cheque collection in a cheque clearing process.

BACKGROUND

Graphical user interfaces are often used to display information.

Graphical user interfaces may result in an unnecessary waste in bandwidth and computer processing power as interaction with the graphical user interface may result in unnecessary data exchanges between the computing device displaying the graphical user interface and one or more computer server systems providing the graphical user interface.

BRIEF DESCRIPTION OF THE DRAWINGS

Embodiments are described in detail below, with reference to the following drawings:

FIG. 7 is a flowchart showing operations performed by a server computer system for providing an interface for real-time tracking of a cheque clearing process according to an embodiment;

Like reference numerals are used in the drawings to denote like elements and features.

DETAILED DESCRIPTION OF VARIOUS EMBODIMENTS

Figure 1:
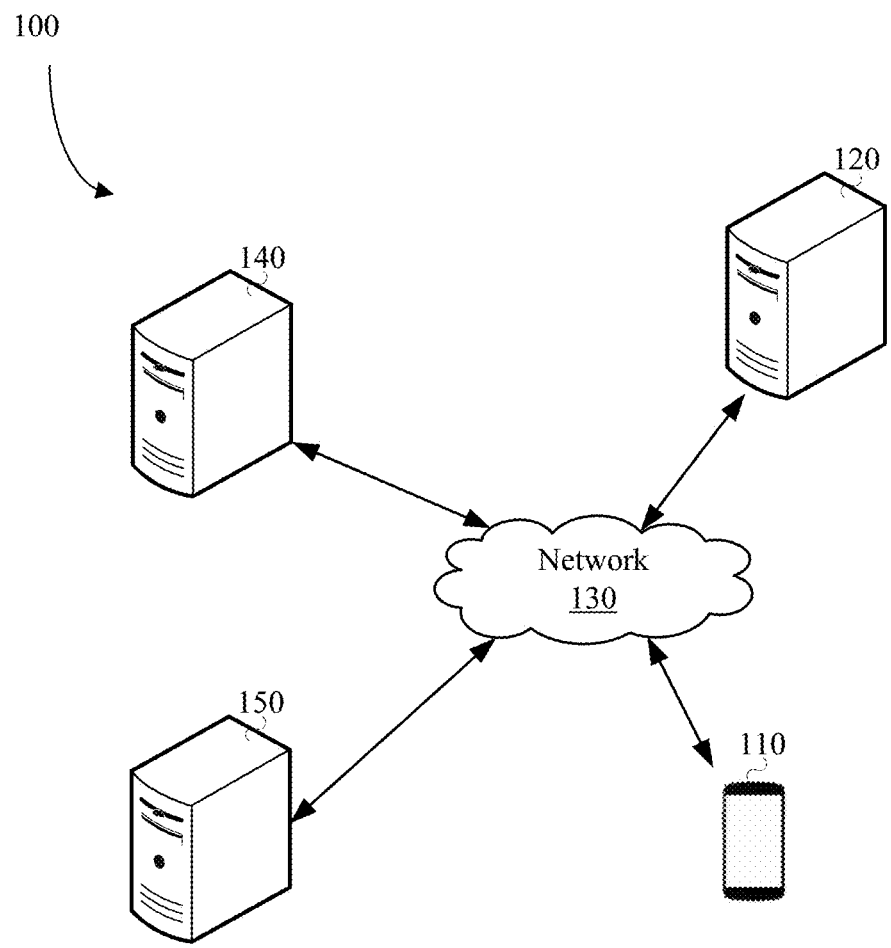
FIG. 1 is a schematic operation diagram illustrating an operating environment of an example embodiment.

Accordingly, in one aspect there is provided a server computer system comprising a communications module; at least one processor coupled to the communications module; and a memory coupled to the at least one processor, the memory storing processor-executable instructions which, when executed by the at least one processor, configure the at least one processor to receive, via the communications module, an indication that a cheque clearing process has been initiated for a cheque; obtain an account number and a routing number for the cheque; perform a lookup to identify a payor of the cheque; and send, via the communications module and to a client device associated with the payor of the cheque, a real-time update indicating that the cheque has been submitted for collection.

In one or more embodiments, when sending the real-time update indicating that the cheque has been submitted for collection, the processor-executable instructions, when executed by the at least one processor, further configure the at least one processor to send, via the communications module and to the client device, an interface that includes a representation of a series of cheque clearing operations for the cheque clearing process and identifies one of the cheque clearing operations as a current cheque clearing operation, the representation of the current cheque clearing operation selectable to input a processing command causing the server computer system to send an electronic message to a system performing the current cheque clearing operation, the electronic message including a request for further details about the current cheque clearing operation.

In one or more embodiments, the processor-executable instructions, when executed by the at least one processor, further configure the at least one processor to receive, via the communications module and from the client device, a signal indicating selection of the representation of the current cheque clearing operation; and send, via the communications module and to the system performing the current cheque clearing operation, an electronic message that includes the request for further details about the current cheque clearing operation.

In one or more embodiments, the request for further details about the current cheque clearing operation includes a request for an image of the cheque.

In one or more embodiments, the processor-executable instructions, when executed by the at least one processor, further configure the at least one processor to determine, in real-time or near real-time, that the current cheque clearing operation has completed; and responsive to determining that the current cheque clearing operation has been completed, enable, in real-time or near real-time, the representation of a next current cheque clearing operation as being selectable to input a processing command causing the server computer system to send an electronic message to a system performing the next current cheque clearing operation.

In one or more embodiments, the indication that the cheque clearing process has been initiated is received by way of an application programming interface associated with a cheque clearing institution.

In one or more embodiments, the processor-executable instructions, when executed by the at least one processor, further configure the at least one processor to engage an optical character recognition module to analyze an image of the cheque to obtain the account number and the routing number for the cheque.

In one or more embodiments, the cheque clearing process is initiated when a payee of the cheque deposits the cheque.

In one or more embodiments, the processor-executable instructions, when executed by the at least one processor, further configure the at least one processor to determine an estimated date for when the cheque clearing process will be complete, wherein the real-time update includes the estimated date for when the cheque clearing process will be complete.

In one or more embodiments, the real-time update includes a selectable interface element to alert fraud prior to the cheque being cleared.

According to another aspect there is provided a computer-implemented method comprising receiving an indication that a cheque clearing process has been initiated for a cheque; obtaining an account number and a routing number for the cheque; performing a lookup to identify a payor of the cheque; and sending, to a client device associated with the payor of the cheque, a real-time update indicating that the cheque has been submitted for collection.

In one or more embodiments, when sending the real-time update indicating that the cheque has been submitted for collection, the method further comprises sending, to the client device, an interface that includes a representation of a series of cheque clearing operations for the cheque clearing process and identifies one of the cheque clearing operations as a current cheque clearing operation, the representation of the current cheque clearing operation selectable to input a processing command causing a server computer system to send an electronic message to a system performing the current cheque clearing operation, the electronic message, including a request for further details about the current cheque clearing operation.

In one or more embodiments, the method further comprises receiving, from the client device, a signal indicating selection of the representation of the current cheque clearing operation; and sending, to the system performing the current cheque clearing operation, an electronic message that includes the request for further details about the current cheque clearing operation.

In one or more embodiments, the request for further details about the current cheque clearing operation includes a request for an image of the cheque.

In one or more embodiments, the method further comprises determining, in real-time or near real-time, that the current cheque clearing operation has completed; and responsive to determining that the current cheque clearing operation has been completed, enabling, in real-time or near real-time, the representation of a next current cheque clearing operation as being selectable to input a processing command causing the server computer system to send an electronic message to a system performing the next current cheque clearing operation.

In one or more embodiments, the indication that the cheque clearing process has been initiated is received by way of an application programming interface associated with a cheque clearing institution.

In one or more embodiments, the method further comprises engaging an optical character recognition module to analyze an image of the cheque to obtain the account number and the routing number for the cheque.

In one or more embodiments, the cheque clearing process is initiated when a payee of the cheque deposits the cheque.

In one or more embodiments, the method further comprises determining an estimated date for when the cheque clearing process will be complete, wherein the real-time update includes the estimated date for when the cheque clearing process will be complete.

According to another aspect there is provided a non-transitory computer readable storage medium comprising computer-executable instructions which, when executed, configure at least one processor to receive an indication that a cheque clearing process has been initiated for a cheque; obtain an account number and a routing number for the cheque; perform a lookup to identify a payor of the cheque; and send, to a client device associated with the payor of the cheque, a real-time update indicating that the cheque has been submitted for collection.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

In the present application, various functionalities discussed herein may be performed by a single processor or by any one of one or more processors, either alone or in combination.

FIG. 1 is a schematic operation diagram illustrating an operating environment of an example embodiment. As shown, the system 100 includes a client device 110 and a server computer system 120 coupled to one another through a network 130, which may include a public network such as the Internet and/or a private network. The client device 110 and the server computer system 120 may be in geographically disparate locations. Put differently, the client device 110 and the server computer system 120 may be located remote from one another.

The client device 110 may be a smartphone as shown in FIG. 1. However, the client device 110 may be a computing device of another type such as for example a laptop computer, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 may be an application server. The mobile application may be resident on the client device 110 and may allow the server computer system 120 to communicate with the client device 110. For example, the mobile application may present one or more graphical user interfaces on a display screen of the client device 110 that may allow the server computer system 120 to communicate with the client device 110.

The server computer system 120 may additionally or alternatively be a financial institution server and may maintain a database that includes various data records. At least some of the data records may be associated with customer bank accounts. For example, a data record may store resource data that may reflect an amount of resources stored in a customer's bank account. At least some of the data records may include additional account data such as for example the name, age, address of the customer, etc. and the account data may be associated with the customer bank accounts. The server computer system 120 may monitor one or more cheque clearing operations for one or more cheques issued from one or more of the customer bank accounts.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

As will be described in more detail below, the server computer system 120 may communicate with one or more third party server computer systems. The server computer system 120 may communicate directly with the one or more third party server computer systems or may communicate with the one or more third party computer systems by way of an application programming interface associated therewith.

In one or more embodiments, the one or more third party server computer systems may include a first third party server computer system 140 associated with a third party financial institution and/or may include a second third party server computer system 150 associated with a cheque clearing institution.

The server computer system 120, the first third party server computer system 140 and the second third party server computer system 150 are computer server systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110 may be adapted to present a graphical user interface that allows for communication with the server computer system 120. As will be described in more detail below, the graphical user interface may additionally allow for communication with the first third party server computer system 140 and/or the second third party server computer system 150.

Figure 2:
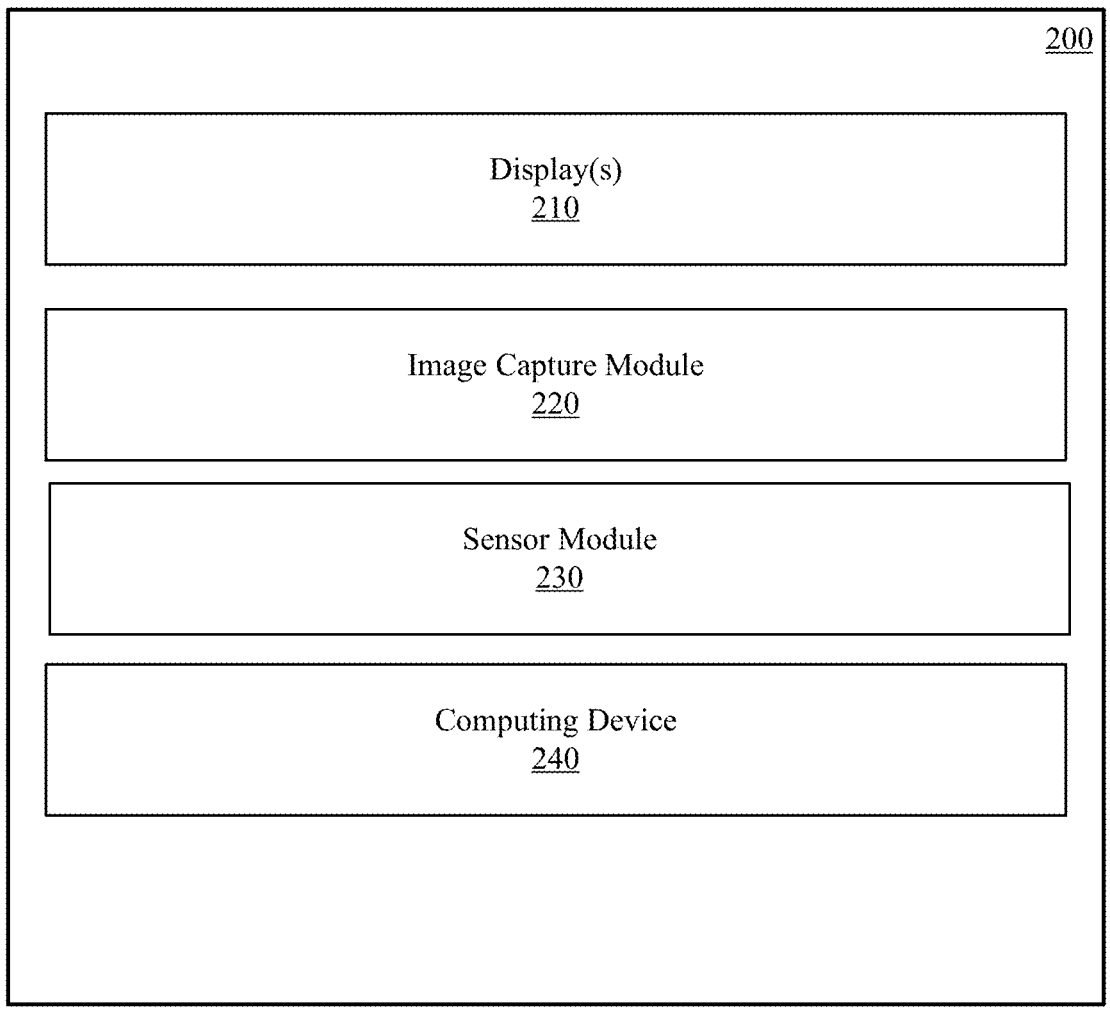
FIG. 2 is a simplified schematic diagram showing components of a computing device.

FIG. 2 is a simplified schematic diagram showing components of an exemplary computing device 200. The client device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1).

The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
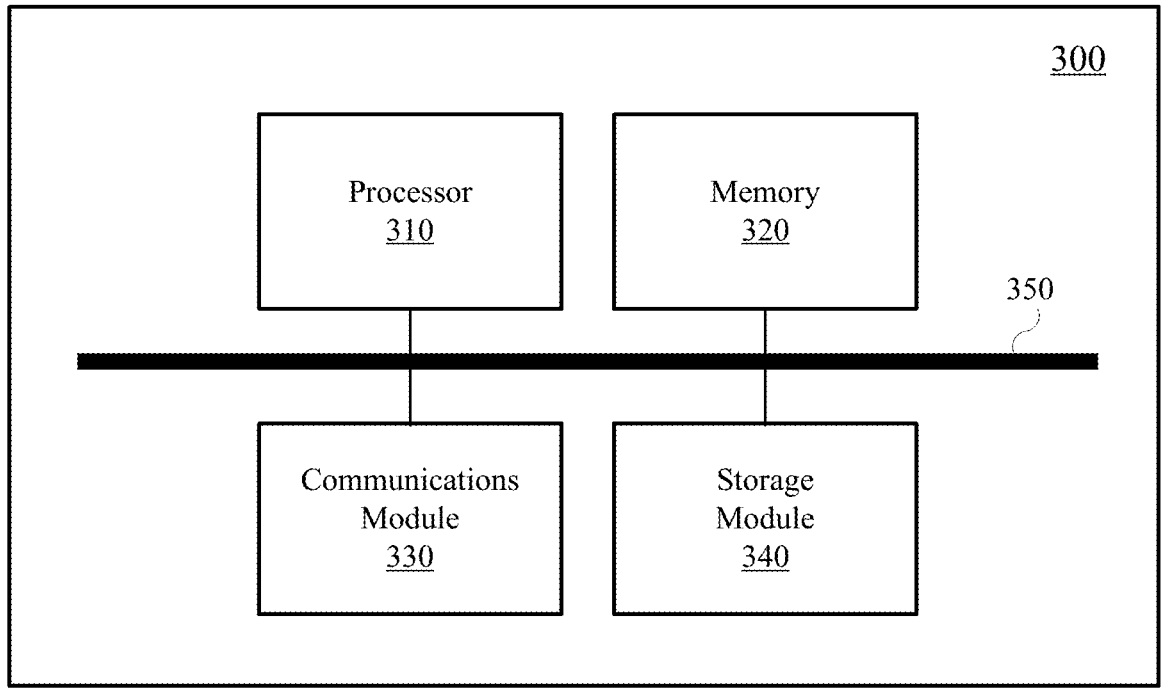
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server computer system 120, the first third party server computer system 140 or the second third party server computer system 150.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persisted storage of the memory 320. Additionally or alternatively, instructions may be executed by the processor 310 directly from read-only memory of the memory 320.

Figure 4:
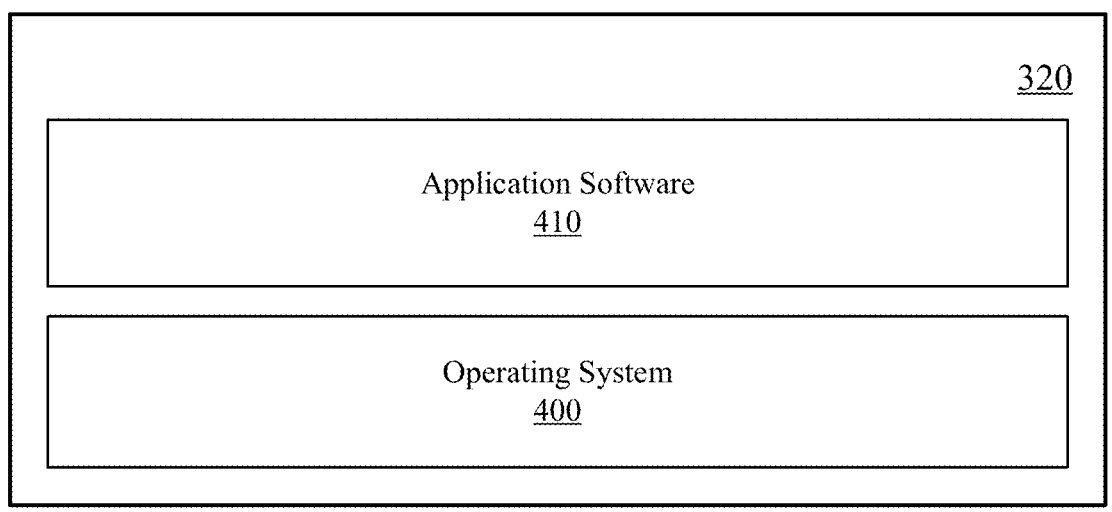
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server computer system 120, the first third party server computer system 140 or the second third party server computer system 150.

While a single application 410 is illustrated in FIG. 3, in operation the memory 320 may include more than one application 410 and different applications 410 may perform different operations. For example, in at least some embodiments in which the computer device 300 is functioning as the client device 110, the applications 410 may include a banking application. The banking application may be configured for secure communications with the server computer system 120 and may provide various banking functions such as, for example, the ability to display a quantum of value in one or more transfer records (e.g. display balances), configure transfers of data (e.g. bill payments and other transfers), and account management functions. The mobile banking application may allow a user to track and receive real-time updates associated with one or more cheque clearing operations for one or more cheques issued by the user.

By way of further example, in at least some embodiments in which the computer device 300 functions as the client device 110, the applications 410 may include a web browser, which may also be referred to as an Internet browser. In at least some such embodiments, the server computer system 120 may be a web server that may serve one or more of the graphical user interfaces described herein. The web server may cooperate with the web browser and may serve as an interface when the interface is requested through the web browser. For example, the web browser may serve as a mobile or online banking interface. The mobile banking interface may provide various banking functions such as, for example, the ability to display a quantum of value in one or more transfer records (e.g. display balances), configure transfers of data (e.g. bill payments and other transfers), and account management functions. The mobile banking interface may allow a user to track and receive real-time updates associated with one or more cheque clearing operations for one or more cheques issued by the user.

The server computer system 120 may be configured to monitor one or more cheque clearing operations and may send real-time updates to the client device 110.

A payor or issuer of a cheque may fill out a physical or electronic cheque with information such as for example the name of the payee or recipient of the cheque, the amount to be paid, the date and the signature. The cheque may be linked to a bank account of the payor and this may be a bank account maintained by the server computer system 120. The payee may then deposit the cheque into their bank account. The payee bank account may be maintained by the server computer system 120 or the first third party server computer system 140 associated with the third party financial institution. The cheque may be deposited by the payee in person at a physical branch of the financial institution, through an automated teller machine (ATM) or electronically via mobile deposit.

Figure 5:
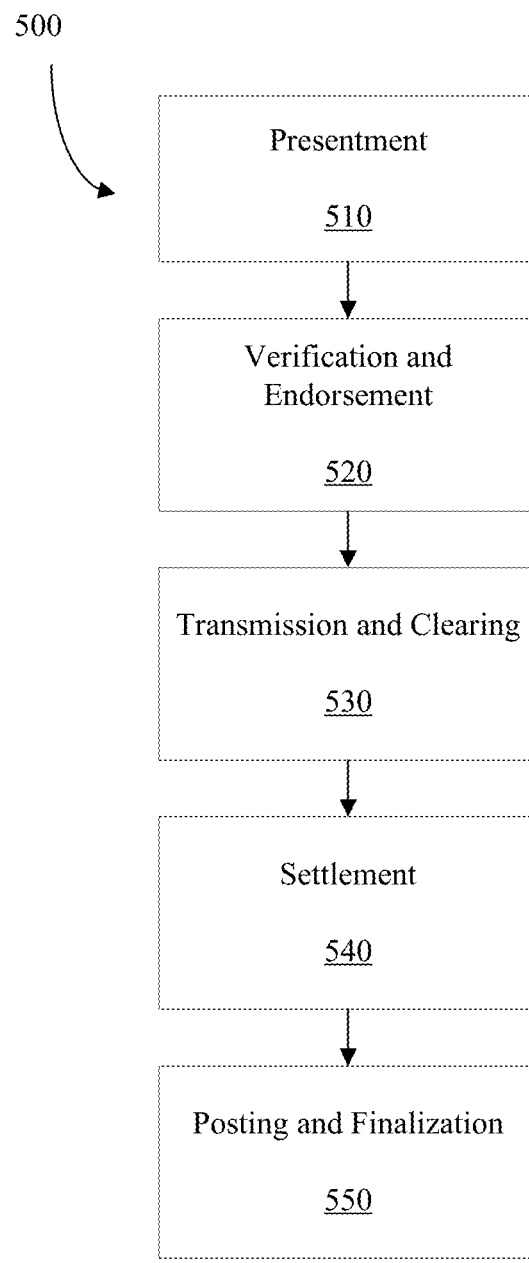
FIG. 5 is a flowchart showing operations performed in an example cheque clearing process according to an embodiment.

A cheque clearing process is initiated when the cheque has been deposited. In one or more embodiments, the cheque clearing process may include a series of cheque clearing operations. Reference is made to FIG. 5, which illustrates, in flowchart form, an example cheque clearing process 500. The cheque clearing process 500 may be implemented by one or more computing devices having suitable processor-executable instructions for causing the one or more computing devices to carry out the described operations. The cheque clearing process 500 may be implemented, in whole or in part, by the second third party server computer system 150 associated with a cheque clearing institution. It will be appreciated that some of the operations may be offloaded to server computer system 120 and/or the first third party server computer system 140 associated with the third party financial institution.

The cheque clearing process 500 includes presentment (step 510).

In one or more embodiments, the cheque may be sent to the second third party server computer system 150 associated with the cheque clearing institution. The physical cheque may be sent to the cheque clearing institution or an electronic image of the cheque may be sent to the server computer system 150 associated with the cheque clearing institution. In this manner, the cheque clearing institution acts as a central entity that facilitates the exchange of cheques between different financial institutions.

The cheque clearing process 500 includes verification and endorsement (step 520).

In one or more embodiments, the cheque clearing institution verifies the authenticity of the cheque, ensuring that it is not counterfeit or fraudulent. The cheque clearing institution may analyze the cheque for irregularities such as a missing signature or insufficient funds. If everything is in order, the cheque clearing institution is endorsed and this indicates that the cheque has been accepted for clearing.

The cheque clearing process 500 includes transmission and clearing (step 530).

In one or more embodiments, the cheque clearing institution may electronically transmit or send the cheque information or an electronic image of the cheque to the financial institution associated with the payor. In one or more embodiments, the financial institution of the payor may be identified by analyzing one or more features of the cheque and these features may include an institution number that identifies the financial institution, for example. The financial institution of the payor may include the financial institution associated with the server computer system 120.

The server computer system 120 may perform one or more operations to clear the cheque and the one or more operations may include verifying the availability of funds in the payor's bank account. Responsive to verifying the availability of funds in the payor's bank account, the server computer system 120 may clear the cheque for payment.

The cheque clearing process 500 includes settlement (step 540).

Once the cheque has been cleared by the server computer system 120, the server computer system 120 may perform operations to transfer the funds from the payor's bank account to the second third party server computer system 150 associated with the cheque clearing institution. In turn, the second third party server computer system 150 transfers the funds to the bank account of the payee by sending the funds to the first third party server computer system 140 associated with the third party financial institution.

The cheque clearing process 500 includes posting and finalization (step 550).

The first third party server computer system 140 associated with the third party financial institution receives the funds from the second third party server computer system 150 associated with the cheque clearing institution and posts the funds to the payee's bank account. The payee's account is credited with the amount specified on the cheque and the cheque transaction is finalized. The third party financial institution may notify the payee that the funds have been deposited and are available for withdrawal.

It will be appreciated that in one or more embodiments, the payor and the payee may have bank accounts at the same financial institution and as such, one or more of the above-described operations may be performed by a server computer system associated with the financial institution and may not require the first third party server computer system 140 and/or the second third party server computer system 150.

The cheque clearing process is initiated when a cheque has been submitted for collection and generally takes multiple days to complete. The server computer system 120 may be configured to monitor one or more cheque clearing operations and may send real-time updates to the client device 110 associated with the payor of the cheque.

Figure 6:
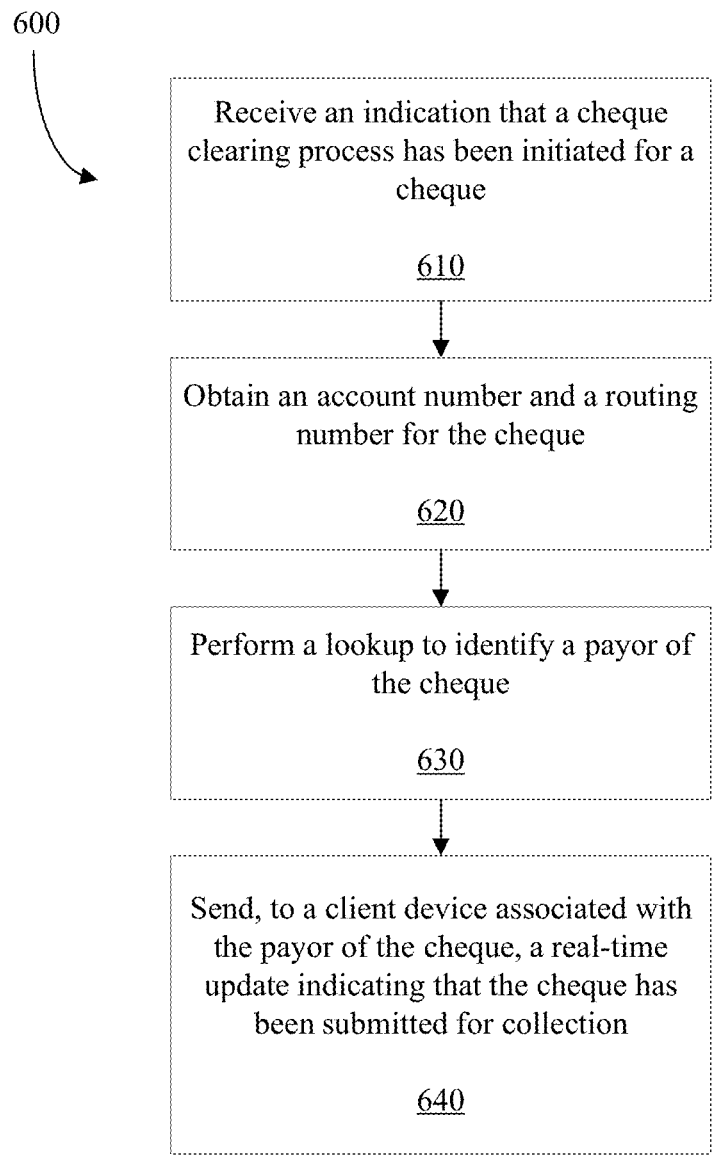
FIG. 6 is a flowchart showing operations performed by a server computer system for providing real-time updates of a cheque clearing process according to an embodiment.

Reference is made to FIG. 6, which illustrates, in flowchart form, a method 600 for providing real-time updates of a cheque clearing process. The method 600 may be implemented by a computing device having suitable processor-executable instructions for causing the computing device to carry out the described operations. The method 600 may be implemented, in whole or in part, by the server computer system 120. It will be appreciated that some of the operations may be offloaded to the client device 110, the first third party server computer system 140 and/or the second third party server computer system 150.

The method 600 includes receiving an indication that a cheque clearing process has been initiated for a cheque (step 610).

In one or more embodiments, the indication that the cheque clearing process has been initiated may be received from the second third party server computer system 150 associated with the cheque clearing institution. For example, the payee of the cheque may deposit the cheque and, during step 510 of the cheque clearing process 500, the second third party server computer system 150 associated with the cheque clearing institution may receive the cheque. The second third party server computer system 150 may analyze the cheque to identify the financial institution of the payor of the cheque which in these embodiments may include the financial institution associated with the server computer system 120. In response, the second third party server computer system 150 may send the indication that the cheque clearing process has been initiated for the cheque to the server computer system 120.

In one or more embodiments, the server computer system 120 may send a request for the indication that the cheque clearing process has been initiated for the cheque and this may be done periodically such as for example once every hour or once per day. In these embodiments, the server computer system 120 may receive, from the payor, a request to track the cheque clearing process for a specific cheque and as such the server computer system 120 may periodically poll the cheque clearing institution until an indication that the cheque clearing process has been initiated for the cheque has been received.

In one or more embodiments, where the payor and the payee both have bank accounts maintained by the server computer system 120, the server computer system 120 may receive the indication that the cheque clearing process has been initiated for the cheque by analyzing the cheque deposited by the payee and identifying that the payor has a bank account hosted by the server computer system 120.

The indication that the cheque clearing process has been initiated for the cheque may be sent directly or may be sent by way of an application programming interface associated with the cheque clearing institution.

The method 600 includes obtaining an account number and a routing number for the cheque (step 620).

In one or more embodiments, the indication that the cheque clearing process has been initiated for the cheque may include cheque data that identifies the amount of the cheque, the account number of the cheque, the routing number of the cheque, etc. The cheque data may additionally include the institution number, the date of the cheque, etc.

In one or more embodiments, to obtain the cheque data, the second third party server computer system 150 may itself engage an OCR module to analyze the image of the cheque to obtain the cheque data and may communicate the cheque data to the server computer system 120.

In one or more embodiments, the server computer system 120 may obtain an image of the cheque from the second third party server computer system 150 associated with the cheque clearing institution. In these embodiments, the server computer system 120 may engage an optical character recognition (OCR) module that may utilize image processing techniques to analyze the image of the cheque to obtain the account number and the routing number for the cheque.

The method 600 includes performing a lookup to identify a payor of the cheque (step 630).

In one or more embodiments, the server computer system 120 may consult a database, using the account number and/or the routing number, to perform the lookup to identify the payor of the cheque. For example, the payor of the cheque may be stored in the database in association with the account number and as such the server computer system 120 may query the database using the account number to identify the payor of the cheque.

The method 600 includes sending, to a client device associated with the payor of the cheque, a real-time update indicating that the cheque has been submitted for collection (step 640).

Responsive to identifying the payor of the cheque, the server computer system 120 may send a real-time update indicating that the cheque has been submitted for collection. In one or more embodiments, the real-time update may include an image of the cheque that has been submitted for collection or may include a selectable link that, when selected, cause the client device 110 to display an image of the cheque.

In one or more embodiments, the real-time update may be displayed in a mobile application resident on the client device 110 such as for example the mobile banking application. In one or more embodiments, the real-time update may be communicated as a text message or an email message and may indicate that the cheque has been submitted for collection. In one or more embodiments, the real-time update may be displayed as a notification within a notification center associated with an operating system executing on the client device 110.

In one or more embodiments, the server computer system 120 may determine an estimated date for when the cheque clearing process will be complete. For example, the server computer system 120 may engage a machine-learning module that may be trained using training data that includes historical cheque clearing data. The historical cheque clearing data may include data from completed cheque clearing processes. The machine-learning module may be trained using the data to determine an estimated date for when the cheque clearing process will be complete. For example, the machine-learning module may estimate the date based on at least one of network traffic, current cheque clearing backlog at the cheque clearing institution, the financial institution of the payor, the financial institution of the payee, etc. In one example, the financial institution of the payor and/or the financial institution of the payee may be slower than other financial institutions to complete one or more cheque clearing operations and this historical information may be used by the machine-learning module to determine the estimate.

The estimated date for when the cheque clearing process will be complete may be included with the real-time update.

In one or more embodiments, the server computer system 120 may track and monitor progress of the cheque clearing operations and may provide updates to the client device 110 allowing the payor of the cheque to track and monitor progress of the cheque clearing operations. In these embodiments, the server computer system 120 may send an interface that may be used to track the cheque clearing operations in real-time.

Reference is made to FIG. 7, which illustrates, in flow-chart form, a method 700 for providing an interface for real-time tracking of a cheque clearing process. The method 700 may be implemented by a computing device having suitable processor-executable instructions for causing the computing device to carry out the described operations. The method 700 may be implemented, in whole or in part, by the server computer system 120. It will be appreciated that some of the operations may be offloaded to the client device 110, the first third party server computer system 140 and/or the second third party server computer system 150.

The method 700 includes sending, to the client device, an interface that includes a representation of a series of cheque clearing operations for the cheque clearing process and identifies one of the cheque clearing operations as a current cheque clearing operation, the representation of the current cheque clearing operation selectable to input a processing command causing the server computer system to send an electronic message to a system performing the current cheque clearing operation, the electronic message including a request for further details about the current cheque clearing operation (step 710).

In one or more embodiments, the server computer system 120 generates the interface, which may include a graphical user interface, based on the cheque clearing operation that has been initiated. For example, in embodiments where the payor and the payee have bank accounts hosted by the server computer system 120, the server computer system 120 may generate the interface to show a first series of operations required to be performed to complete the cheque clearing process. As another example, in embodiments where the payee does not have a bank account hosted by the server computer system 120, the server computer system 120 may generate the interface to show a second series of cheque clearing operations required to be performed to complete the cheque clearing process.

Figure 8:
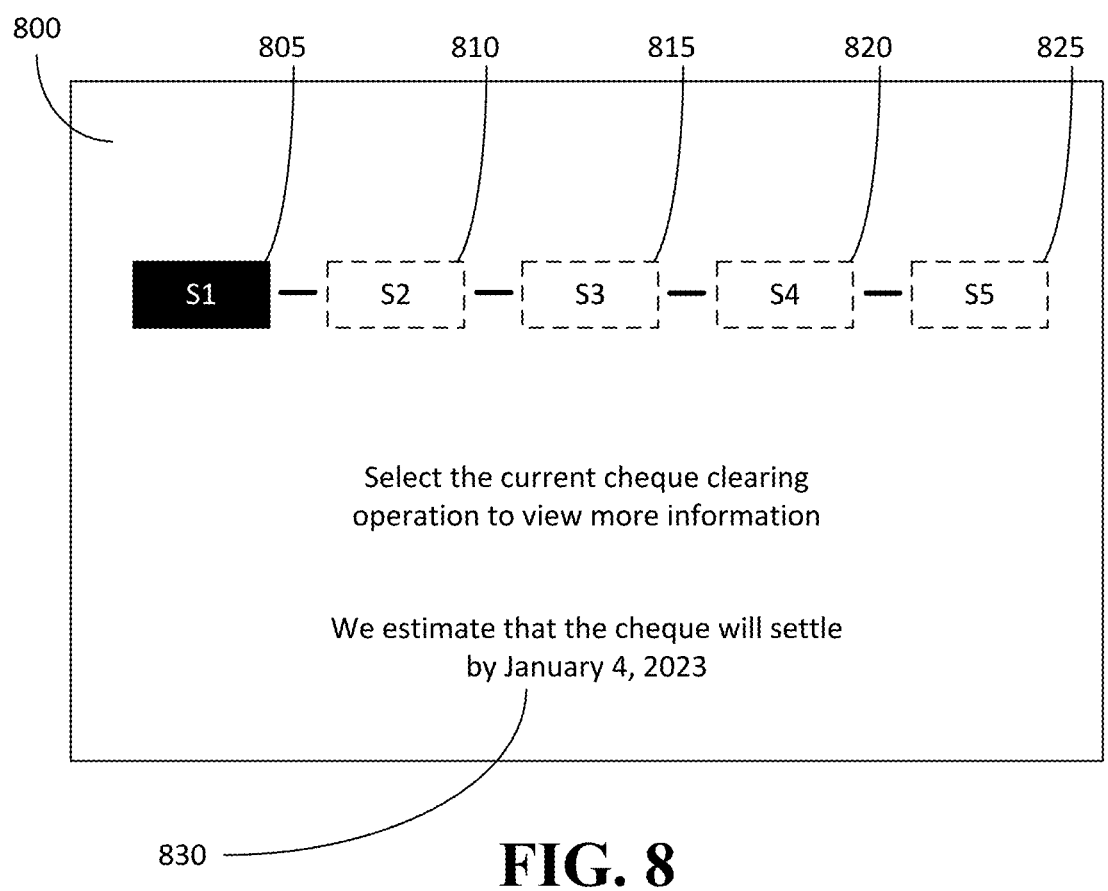
FIGS. 8 to 13 are example graphical user interfaces.

An example graphical user interface 800 is shown in FIG. 8. As can be seen, the graphical user interface 800 includes interface elements 805, 810, 815, 820 and 825 that represent a series of cheque clearing operations for a cheque clearing process. The series of cheque clearing operations may include operations performed for the cheque clearing process 500 described herein. Specifically, interface element 805 may be associated with step 510 of the cheque clearing process 500 ("S1"), the interface element 810 may be associated with step 520 of the cheque clearing process 500 ("S2"), interface element 815 may be associated with step 530 of the cheque clearing process 500 ("S3"), the interface element 820 may be associated with step 540 of the cheque clearing process 500 ("S4"), and the interface element 825 may be associated with step 550 of the cheque clearing process 500 ("S5").

The graphical user interface 800 identifies one of the cheque clearing operations as a current cheque clearing operation. The current cheque clearing operation may include the cheque clearing operation that is currently being completed. In the example shown in FIG. 8, the graphical user interface 800 identifies the step S1 as the current cheque clearing operation being performed and this is done by presenting or displaying the interface element 805 in a different format than the other interface elements. The different format may include highlighting the interface element, presenting the interface element in a different colour, size, shape, etc. compared to the other interface elements.

The representation of the current cheque clearing operation is enabled as selectable to input a processing command causing the server computer system to send an electronic message to a system performing the current cheque clearing operation, the electronic message including a request for further details about the current cheque clearing operation. In one or more embodiments, the representation of the current cheque clearing operation may be selected by, for example, the user performing a tap gesture on a display screen of the client device 110 that corresponds to a location of the representation of the current cheque clearing operation on the graphical user interface. In the example shown in FIG. 8, the interface element 805 that is the representation of the current cheque clearing operation S1 is selectable. It will be appreciated that the other interface elements 810, 815, 820, 825 are not selectable. Put another way, if the user performs a tap gesture on the display screen of the client device 110 that corresponds to the location of any one of the interface elements 810, 815, 820, 825, no actions will be performed by the client device 110 or the server computer system 120. In this manner, since only the interface element associated with the current cheque clearing operation that is being performed may be selected, network usage may be reduced or minimized.

The graphical user interface 800 shown in FIG. 8 also displays a message 830 that includes the estimated date for when the cheque clearing process will be complete.

The user may select the representation of the current cheque clearing operation by performing a tap gesture on the display screen of the client device 110 that corresponds to a location of the representation of the current cheque clearing operation step on the graphical user interface. In response to selection of the representation of the current cheque clearing operation, the server computer system 120 may receive a signal indicating selection of the representation of the current cheque clearing operation. The server computer system 120 may send, to the system performing the current cheque clearing operation, an electronic message that includes a request for further details about the current cheque clearing operation.

Figure 9:
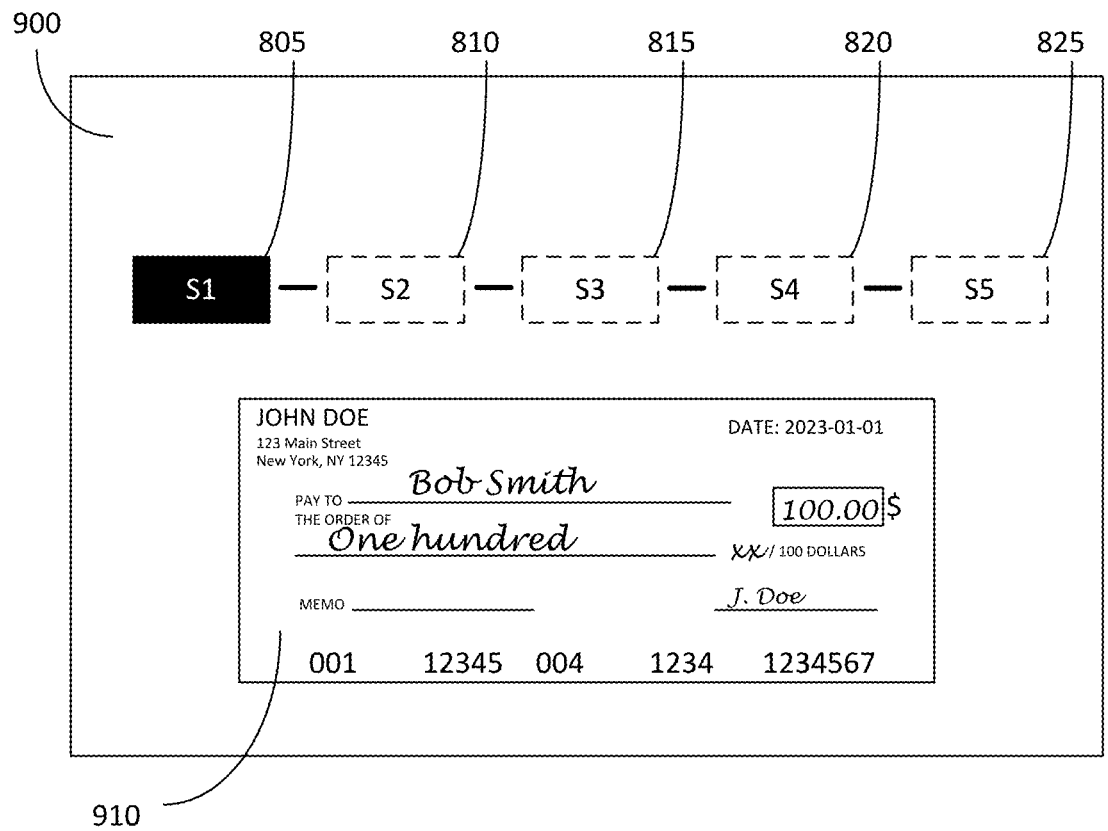

In the example shown in FIG. 8, the user may select the interface element 805 and in response the server computer system 120 may send, to the second third party server computer system 150 associated with the cheque clearing institution, a request for further details about the current cheque clearing operation which, in this example, may include a request for an image of the cheque. The server computer system 120 may receive, from the second third party server computer system 150 associated with the cheque clearing institution, the image of the cheque. The server computer system 120 may update the graphical user interface 800 to display the image of the cheque. An example updated graphical user interface 900 is shown in FIG. 9. As can be seen, the updated graphical user interface 900 includes an image 910 of the cheque that is currently being cleared.

Referring back to FIG. 7, the method 700 includes determining, in real-time or near real-time, that the current cheque clearing operation has completed (step 720).

In one or more embodiments, the server computer system 120 may receive an indication that the current cheque clearing operation has been completed. For example, the server computer system performing the current cheque clearing operation, such as for example the first third party server computer system 140 or the second third party server computer system 150, may complete the current cheque clearing operation and may send an indication that the cheque clearing operation has been completed.

The method 700 includes enabling, in real-time or near-real time, the representation of a next current cheque clearing operation as being selectable to input a processing command causing the server computer system to send an electronic message to a system performing the next current cheque clearing operation (step 730).

Responsive to determining that the current cheque clearing operation has been completed, the server computer system 120 may disable the representation of the current cheque clearing operation as selectable. In this manner, the user can no longer select the representation of the current cheque clearing operation and this prevents unnecessary communication between the client device 110 and/or the server computer system. As a result, network usage is reduced or minimized.

The server computer system 120 may update the graphical user interface to enable the representation of a next current cheque clearing operation as being selectable to input a processing command causing the server computer system to send an electronic message to a system performing the next current cheque clearing operation.

Figure 10:
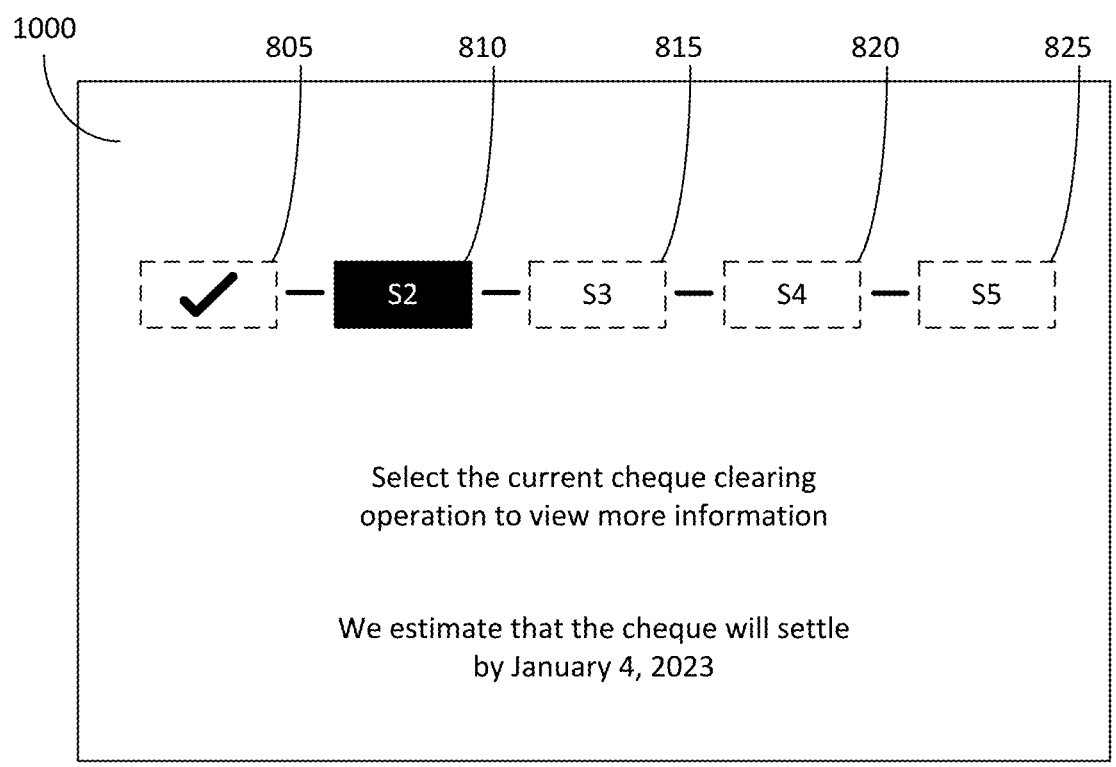

An example updated graphical user interface 1000 is shown in FIG. 10. As can be seen, the graphical user interface has been updated to identify the step S2 as the next current cheque clearing operation being performed and this is done by presenting or displaying the interface element 810 in a different format than the other interface elements. Further, in the example shown, the interface element 805 has been disabled as selectable and has been updated to indicate that the step S1 has been completed.

The user may select the representation of the next current cheque clearing operation by performing a tap gesture on the display screen of the client device 110 that corresponds to a location of the representation of the next current cheque clearing operation on the graphical user interface. In response to selection of the representation of the next current cheque clearing operation, the server computer system 120 may receive a signal indicating selection of the representation of the next current cheque clearing operation. The server computer system 120 may send, to the system performing the next current cheque clearing operation, an electronic message that includes a request for further details about the next current cheque clearing operation.

Figure 11:
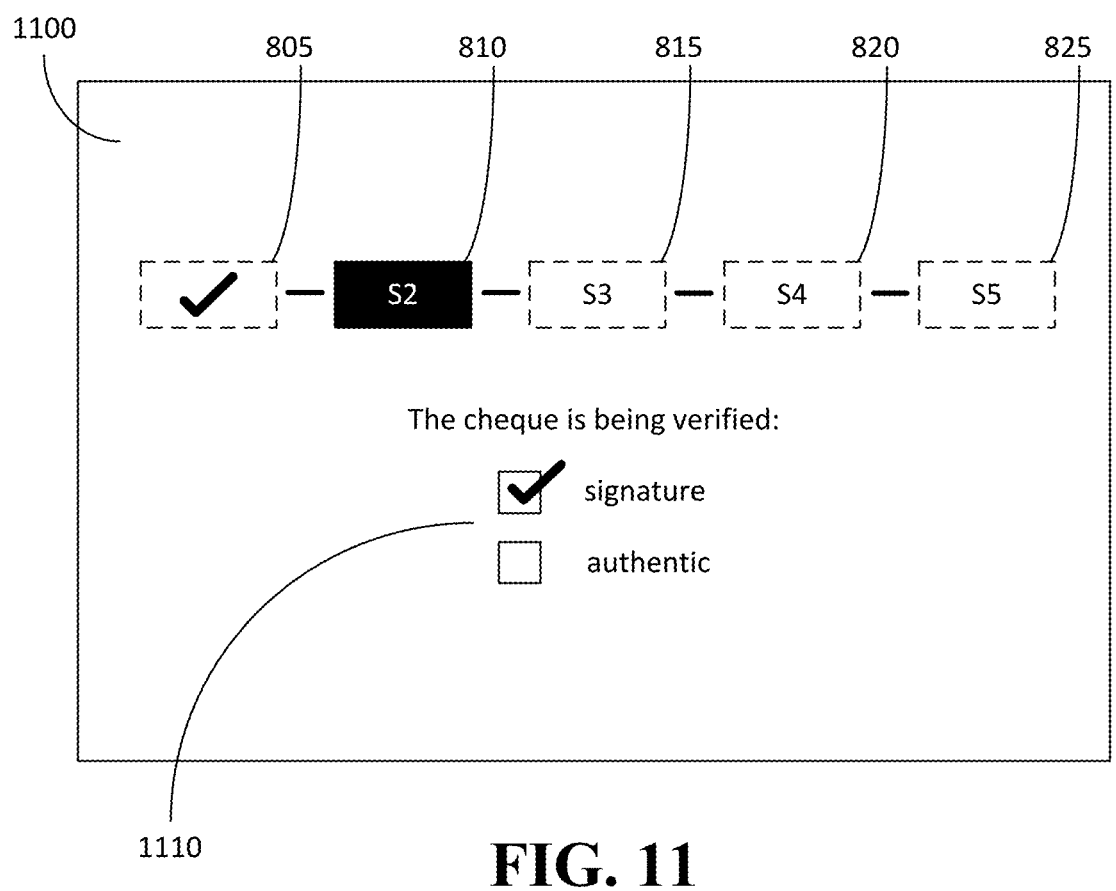

In the example shown in FIG. 10, the user may select the interface element 810 and in response the server computer system 120 may send, to the second third party server computer system 150 associated with the cheque clearing institution, a request for further details about the current cheque clearing operation which, in this example, may include a request for details about the verification and endorsement operation. The server computer system 120 may receive, from the second third party server computer system 150 associated with the cheque clearing institution, details about the verification and endorsement operation. The server computer system 120 may update the graphical user interface 800 to display details about the verification and endorsement operation. An example updated graphical user interface 1100 is shown in FIG. 11. As can be seen, the updated graphical user interface 1100 includes details regarding the verification and endorsement operation. Specifically, the updated graphical user interface 1100 includes a checklist 1110 identifying that the signature on the cheque has been verified and that authenticity of the cheque is currently being evaluated.

The server computer system 120 may continue to monitor the progress of the series of cheque clearing operations and may update the interface, which may include a graphical user interface, to enable the representation of a next current cheque clearing operation as being selectable to input a processing command causing the server computer system to send an electronic message to a system performing the next current cheque clearing operation. In one or more embodiments, the system performing the next current cheque clearing operation may be a different system than the system that performed the previous cheque clearing operation. For example, the second third party server computer system 150 may perform the first two cheque clearing operations and the server computer system 120 may perform the third cheque clearing operation. As such, as the graphical user interface is updated, communication between the client device 110 and/or the server computer system 120 and the various systems required to perform the series of cheque clearing operations may be selectively enabled and disabled.

Figure 12:
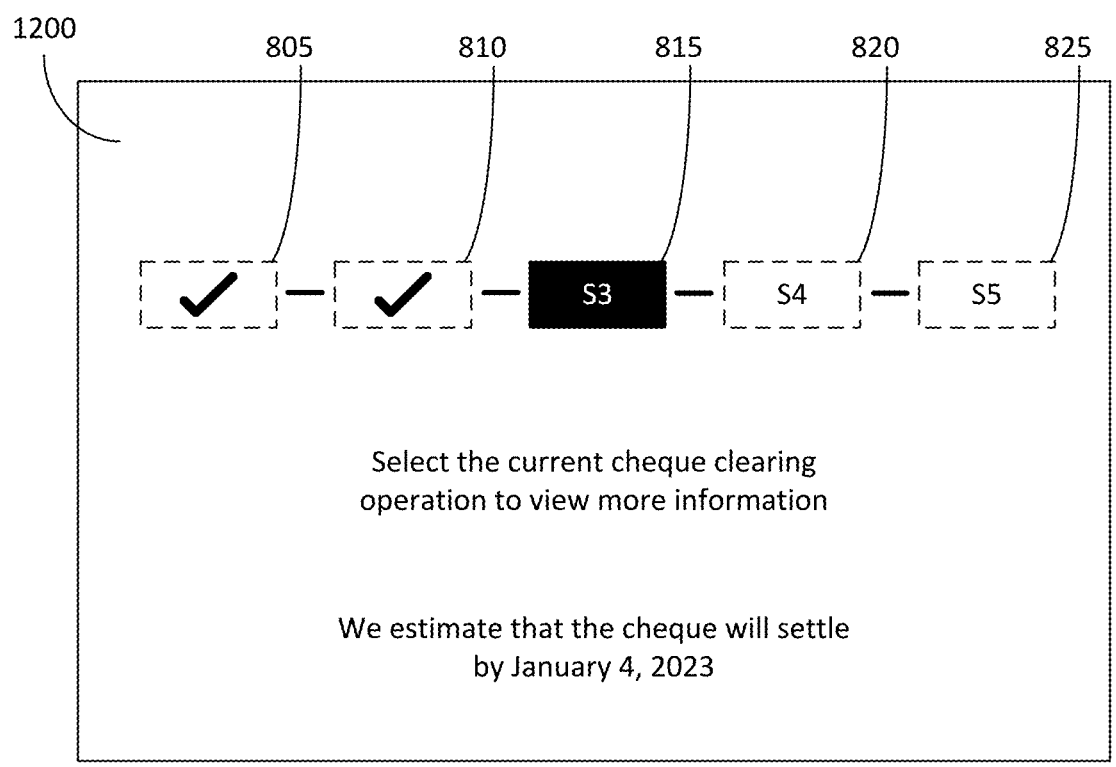

An example updated graphical user interface 1200 is shown in FIG. 12. As can be seen, the graphical user interface has been updated to identify the step S3 as the next current cheque clearing operation being performed and this is done by presenting or displaying the interface element 815 in a different format than the other interface elements. Further, in the example shown, the interface elements 805 and 810 have been disabled as selectable and have been updated to indicate that the steps S1 and S2 have been completed.

The user may select the representation of the next current cheque clearing operation by performing a tap gesture on the display screen of the client device 110 that corresponds to a location of the representation of the next current cheque clearing operation on the graphical user interface. In response to selection of the representation of the next current cheque clearing operation, the server computer system 120 may receive a signal indicating selection of the representation of the next current cheque clearing operation. The server computer system 120 may send, to the system performing the next current cheque clearing operation, an electronic message that includes a request for further details about the next current cheque clearing operation.

In the example shown in FIG. 12, the user may select the interface element 815 and in response the server computer system 120 may obtain further details about the current cheque clearing operation directly as the server computer system 120 itself is responsible for completing the cheque clearing operation S3. The server computer system 120 may obtain further details about the transmission and clearing operation and this may include obtaining details regarding the availability of funds in the payor's bank account.

Figure 13:
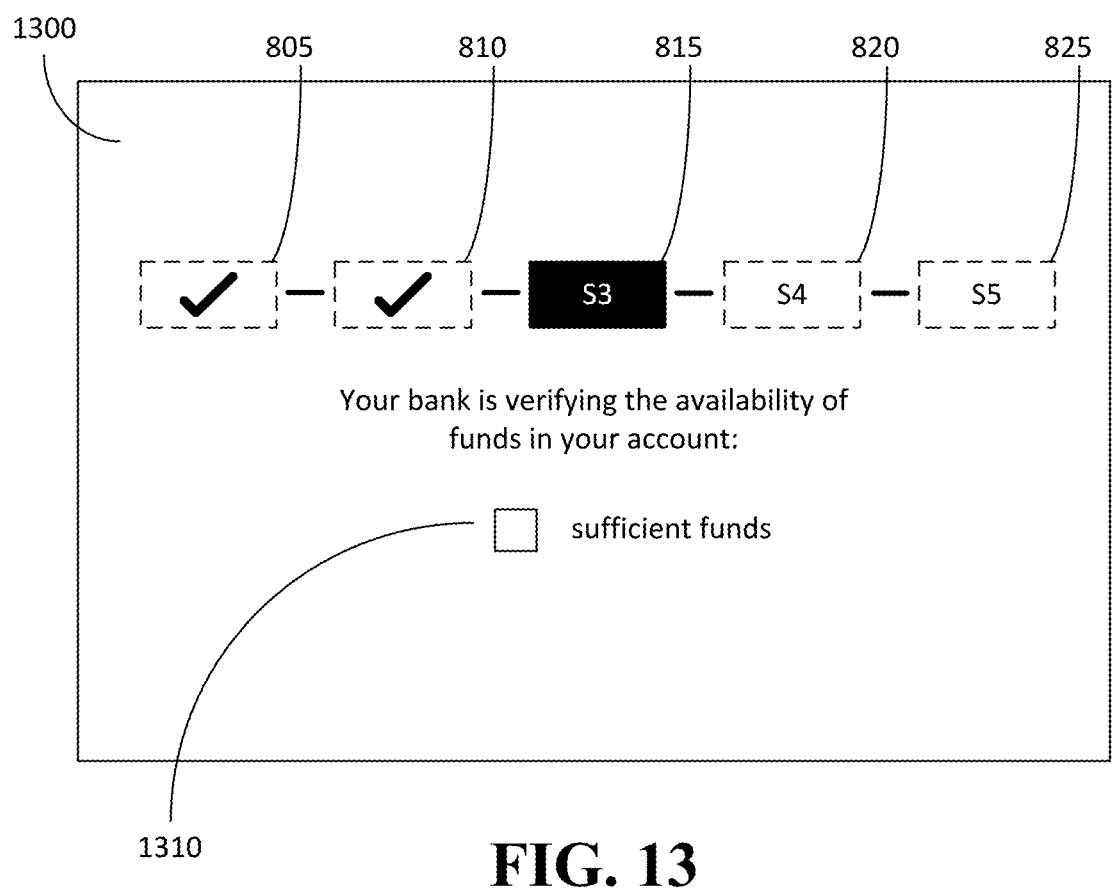

The server computer system 120 may update the graphical user interface 1200 to display details about the transmission and clearing operation. An example updated graphical user interface 1300 is shown in FIG. 13. As can be seen, the updated graphical user interface 1300 includes details regarding the transmission and clearing operation. Specifically, the updated graphical user interface 1300 includes a checklist 1310 identifying that the availability of funds is currently being evaluated.

In one or more embodiments, the server computer system 120 may only track the cheque clearing process for a particular cheque when it has been requested by the payor.

Figure 14:
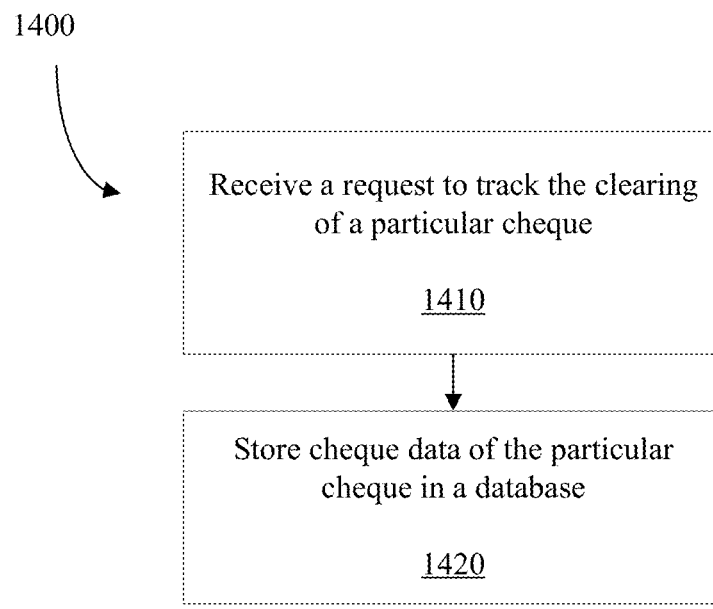
FIG. 14 is a flowchart showing operations performed by a server computer system for providing an interface for real-time tracking of a cheque clearing process according to an embodiment.

Reference is made to FIG. 14, which illustrates, in flowchart form, a method 1400 for receiving a request to track the cheque clearing process for a particular cheque. The method 1400 may be implemented by a computing device having suitable processor-executable instructions for causing the computing device to carry out the described operations. The method 1400 may be implemented, in whole or in part, by the server computer system 120. It will be appreciated that some of the operations may be offloaded to the client device 110.

The method 1400 includes receiving a request to track the clearing of a particular cheque (step 1410).

In one or more embodiments, the payor may submit a request within a mobile banking application or mobile banking website. For example, the payor may submit a request that includes the cheque number that they would like to track. The server computer system 120 may obtain additional cheque data such as for example the account number and routing number for the cheque. The cheque may include a cheque that the payor has recently given to a payee.

The method 1400 includes storing cheque data of the particular cheque in a database (step 1420).

The server computer system 120 may maintain a database that includes a list of cheques to be tracked. As such, the server computer system 120 may update the database to include the cheque data for the cheque that is to be tracked.

The server computer system 120 may perform operations to track only the cheques included in the list of cheques to be tracked. For example, the server computer system 120 may periodically provide the list of cheques to be tracked to the second third party server computer system 150. Each time a cheque is received at the second third party server computer system 150, a check may be performed to determine whether or not the cheque is to be tracked. If the cheque is to be tracked, the operations described herein may be performed to provide real-time updates for the clearing of the cheque. If the cheque is not to be tracked, the second third party server computer system 150 and/or the server computer system 120 may clear the cheque without providing any real-time updates therefore. In this manner, only cheques that have been requested to be tracked are tracked and this may reduce the amount of computer processing required to provide real-time updates for cheque clearing.

Figure 15:
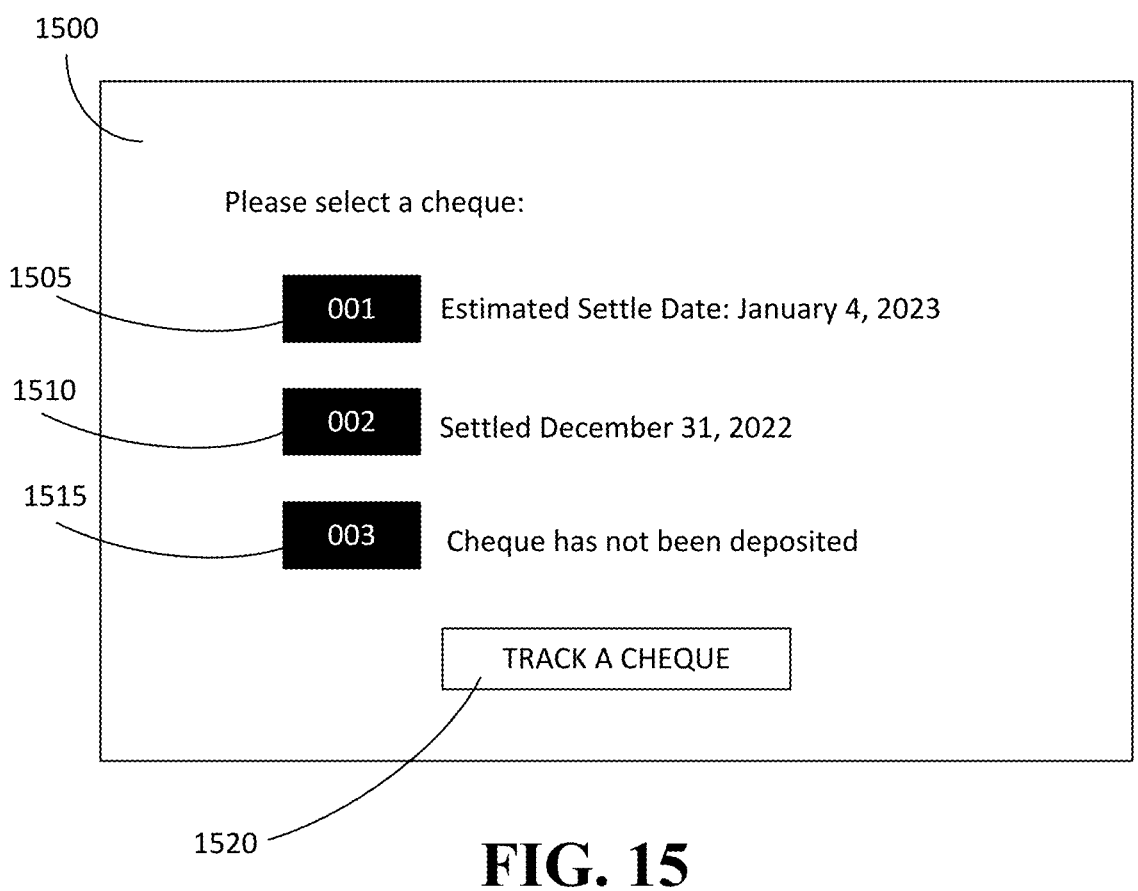
FIGS. 15 and 16 are additional examples of graphical user interfaces.

The server computer system 120 may provide a graphical user interface to the client device 110 that includes a list of cheques that are currently being tracked based on requests made by the user. An example graphical user interface 1500 is shown in FIG. 15. As can be seen, the graphical user interface 1500 includes a list of cheques that are currently being tracked. The list includes selectable interface elements 1505, 1510, 1515 that may be selected to view real-time updates therefore. For example, selection of one of the interface elements may update the graphical user interface to display a graphical user interface similar to the graphical user interface 800 described herein. The graphical user interface 1500 includes a selectable interface element 1520 to add a new cheque to be tracked and selection of the interface element 1520 may cause the client device 110 to display a graphical user interface requesting cheque data for the cheque to be tracked. The graphical user interface 1500 may be updated to include the new cheque.

It will be appreciated that no real-time updates may be available for a cheque and this may be because the cheque has not yet been deposited. For example, the graphical user interface 1500 indicates that cheque 0003 has not yet been deposited.

In manners described herein, a simple graphical user interface is displayed that displays a visual representation of a series of cheque clearing operations. The simplicity of the graphical user interface allows computing devices that have particularly small display screens to display the entire series of cheque clearing operations. Further, by enabling a representation of a current cheque clearing operation step as selectable to obtain and display information, communication to server computer systems that are not currently performing the current cheque clearing operation is blocked and as a result this may reduce or minimize network usage. Put another way, the client device 110 is only permitted to obtain information for the current cheque clearing operation and as such network traffic is reduced.

Further, since the server computer system 120 provides real-time updates immediately in response to receiving an indication that a cheque clearing process has been initiated for a cheque and includes an estimated date as to when the cheque clearing process will be complete, the payor may ensure sufficient funds are available in their account before the cheque is cleared.

Still further, since the server computer system 120 provides real-time updates immediately in response to receiving an indication that a cheque clearing process has been initiated for a cheque, fraud is reduced. For example, in response to receiving the real-time update indicating that a cheque has been submitted for collection, the payor may request and obtain additional details about the cheque such as for example an image of the cheque. The payor may review the cheque and may determine that the cheque is fraudulent and may perform operations to cancel the cheque before the funds are withdrawn from their account.

Figure 16:
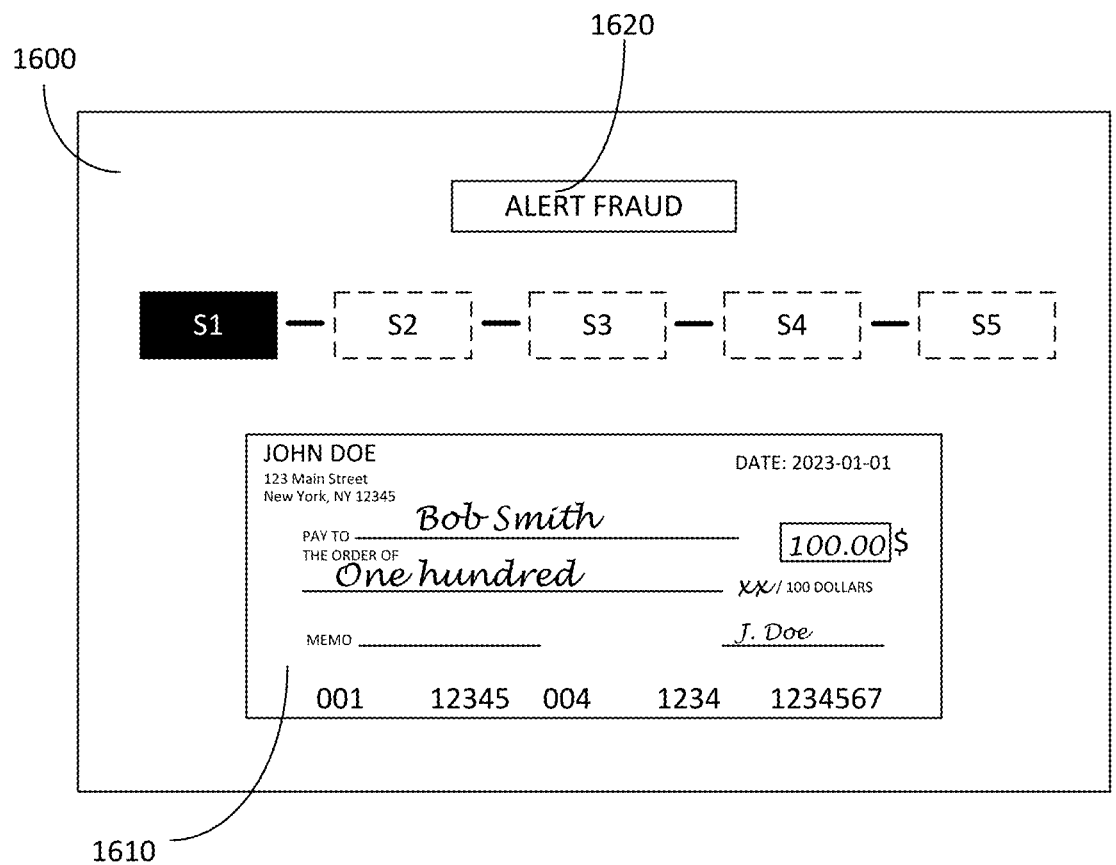

An example is shown in FIG. 16. As can be seen, a graphical user interface 1600 is displayed that includes an image 1610 of the cheque currently being cleared (similar to the graphical user interface 900 shown in FIG. 9). The graphical user interface 1600 includes a selectable option 1620 to alert fraud. The payor may receive a real-time update on the client device 110 indicating that one of their cheques is being cleared. The payor may request additional details which may include a request for an image of the cheque. The payor may view the image of the cheque and may identify that the cheque is fraudulent in that they did not issue the cheque. As such, the payor may select the selectable option 1620 to alert fraud and this may cancel the cheque clearing operation. The cheque clearing operation may be cancelled prior to funds being withdrawn from the payor account and this may drastically reduce the amount of remedial computer operations that may be required to undo the fraud.

In prior art systems, the payor of a cheque being cleared only receives notice when funds have been withdrawn from their account. As such, fraud can only be flagged after the cheque has already cleared. Embodiments described herein remedy this deficiency by providing real-time updates to the payor of a cheque throughout the entire cheque clearing process.

The systems and methods described herein may be made available to one or more third party financial institutions and this may be done by way of an application programming interface.

Although in embodiments described herein, information is displayed on the graphical user interface in response to selection of the representation of the current cheque clearing operation (or next current cheque clearing operation), in one or more embodiments the information may be displayed automatically. In these embodiments, the server computer system 120 and/or the client device 110 may automatically obtain information from the server computer system performing the current cheque clearing operation (or next current cheque clearing operation) and the obtained information may be automatically displayed on the graphical user interface. Further, the representation of the current cheque clearing operation may be selectable to display additional information. For example, the graphical user interface may display a summary of information obtained from the server computer system performing the current cheque clearing operation (or next current cheque clearing operation) and, responsive to selection of the representation of the current cheque clearing operation (or next current cheque clearing operation), additional or more detailed information may be displayed.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
a communications module;
at least one processor coupled to the communications module; and
a memory coupled to the at least one processor, the memory storing processor-executable instructions which, when executed by the at least one processor, configure the at least one processor to:
receive, via the communications module, an indication that a cheque clearing process has been initiated for a cheque;
identify a payor of the cheque; and
send, via the communications module and to a client device associated with the payor of the cheque, a notification indicating that the cheque has been submitted for collection.

2. The server computer system of claim 1, wherein the indication that the cheque clearing process has been initiated for the cheque includes an image of the cheque.

3. The server computer system of claim 2, wherein when identifying the payor of the cheque, the processor-executable instructions, when executed by the at least one processor, further configure the at least one processor to:
engage an optical character recognition module to analyze an image of the cheque to obtain an identifier associated with the payor of the cheque; and
perform a lookup using the identifier associated with the payor of the cheque to identify the payor of the cheque.

4. The server computer system of claim 2, wherein the notification includes the image of the cheque.

5. The server computer system of claim 2, wherein the notification includes a selectable option for requesting the image of the cheque.

6. The server computer system of claim 5, wherein the processor-executable instructions, when executed by the at least one processor, further configure the at least one processor to:
  receive, via the communications module and from the client device associated with the payor of the cheque, a signal indicating selection of the selectable option for requesting the image of the cheque;
  obtain the image of the cheque; and
  send, via the communications module and to the client device associated with the payor of the cheque, a signal that causes the client device to display a graphical user interface that includes an image of the cheque.

7. The server computer system of claim 6, wherein the graphical user interface includes a selectable option to alert fraud.

8. The server computer system of claim 7, wherein the processor-executable instructions, when executed by the at least one processor, further configure the at least one processor to:
  receive, via the communications module and from the client device associated with the payor of the cheque, a signal indicating selection of the selectable option for alerting fraud; and
  perform operations to cancel the cheque clearing process for the cheque.

9. The server computer system of claim 1, wherein the indication that the cheque clearing process has been initiated for the cheque is received from a third party server computer system associated with a cheque clearing institution.

10. The server computer system of claim 1, wherein the notification is sent by way of at least one of electronic mail, short message service (SMS) messaging, text messaging or within a mobile application executing on the client device.

11. The server computer system of claim 1, wherein the notification indicating that the cheque has been submitted for collection is displayed within a notification center associated with an operating system executing on the client device.

12. The server computer system of claim 1, wherein when sending the notification indicating that the cheque has been submitted for collection, the processor-executable instructions, when executed by the at least one processor, further configure the at least one processor to:
  send, via the communications module and to the client device, an interface that includes a representation of a series of cheque clearing operations for the cheque clearing process and identifies one of the cheque clearing operations as a current cheque clearing operation, the representation of the current cheque clearing operation selectable to input a processing command causing the server computer system to send an electronic message to a system performing the current cheque clearing operation, the electronic message including a request for further details about the current cheque clearing operation.

13. The server computer system of claim 12, wherein the processor-executable instructions, when executed by the at least one processor, further configure the at least one processor to:
  receive, via the communications module and from the client device, a signal indicating selection of the representation of the current cheque clearing operation; and
  send, via the communications module and to the system performing the current cheque clearing operation, an electronic message that includes the request for further details about the current cheque clearing operation.

14. The server computer system of claim 13, wherein the request for further details about the current cheque clearing operation includes a request for an image of the cheque.

15. The server computer system of claim 12, wherein the processor-executable instructions, when executed by the at least one processor, further configure the at least one processor to:
  determine, in real-time or near real-time, that the current cheque clearing operation has been completed; and
  responsive to determining that the current cheque clearing operation has been completed, enable, in real-time or near real-time, the representation of a next current cheque clearing operation as being selectable to input a processing command causing the server computer system to send an electronic message to a system performing the next current cheque clearing operation.

16. The server computer system of claim 1, wherein the indication that the cheque clearing process has been initiated is received by way of an application programming interface associated with a cheque clearing institution.

17. The server computer system of claim 1, wherein the cheque clearing process is initiated when a payee of the cheque deposits the cheque.

18. A computer-implemented method comprising:
  receiving, via a communications module, an indication that a cheque clearing process has been initiated for a cheque;
  identifying a payor of the cheque; and
  sending, via the communications module and to a client device associated with the payor of the cheque, a notification indicating that the cheque has been submitted for collection.

19. The computer-implemented method of claim 18, wherein the indication that the cheque clearing process has been initiated for the cheque includes an image of the cheque.

20. The computer-implemented method of claim 19, wherein when identifying the payor of the cheque, the method further comprises:
  engaging an optical character recognition module to analyze an image of the cheque to obtain an identifier associated with the payor of the cheque; and
  performing a lookup using the identifier associated with the payor of the cheque to identify the payor of the cheque.

21. The computer-implemented method of claim 19, wherein the notification includes the image of the cheque.

22. The computer-implemented method of claim 19, wherein the notification includes a selectable option for requesting the image of the cheque.

23. The computer-implemented method of claim 22, further comprising:
  receiving, via the communications module and from the client device associated with the payor of the cheque, a signal indicating selection of the selectable option for requesting the image of the cheque;
  obtaining the image of the cheque; and
  sending, via the communications module and to the client device associated with the payor of the cheque, a signal that causes the client device to display a graphical user interface that includes an image of the cheque.

24. The computer-implemented method of claim 23, wherein the graphical user interface includes a selectable option to alert fraud.

25. The computer-implemented method of claim 24, further comprising:
receiving, via the communications module and from the client device associated with the payor of the cheque, a signal indicating selection of the selectable option for alerting fraud; and
performing operations to cancel the cheque clearing process for the cheque.

26. The computer-implemented method of claim 18, wherein the indication that the cheque clearing process has been initiated for the cheque is received from a third party server computer system associated with a cheque clearing institution.

27. The computer-implemented method of claim 18, wherein the notification is sent by way of at least one of electronic mail, short message service (SMS) messaging, text messaging or within a mobile application executing on the client device.

28. The computer-implemented method of claim 18, wherein the notification indicating that the cheque has been submitted for collection is displayed within a notification center associated with an operating system executing on the client device.

29. The computer-implemented method of claim 18, wherein when sending the notification indicating that the cheque has been submitted for collection, the method further comprises:
sending, to the client device, an interface that includes a representation of a series of cheque clearing operations for the cheque clearing process and identifies one of the cheque clearing operations as a current cheque clearing operation, the representation of the current cheque clearing operation selectable to input a processing command causing a server computer system to send an electronic message to a system performing the current cheque clearing operation, the electronic message including a request for further details about the current cheque clearing operation.

30. The computer-implemented method of claim 29, further comprising:
receiving, from the client device, a signal indicating selection of the representation of the current cheque clearing operation; and
sending, to the system performing the current cheque clearing operation, an electronic message that includes the request for further details about the current cheque clearing operation.

31. The computer-implemented method of claim 30, wherein the request for further details about the current cheque clearing operation includes a request for an image of the cheque.

32. The computer-implemented method of claim 29, further comprising:
determining, in real-time or near real-time, that the current cheque clearing operation has been completed; and
responsive to determining that the current cheque clearing operation has been completed, enabling, in real-time or near real-time, the representation of a next current cheque clearing operation as being selectable to input a processing command causing the server computer system to send an electronic message to a system performing the next current cheque clearing operation.

33. The computer-implemented method of claim 18, wherein the indication that the cheque clearing process has been initiated is received by way of an application programming interface associated with a cheque clearing institution.

34. The computer-implemented method of claim 18, wherein the cheque clearing process is initiated when a payee of the cheque deposits the cheque.

35. A non-transitory computer readable storage medium comprising computer-executable instructions which, when executed, configure at least one processor to:
receive, via a communications module, an indication that a cheque clearing process has been initiated for a cheque;
identify a payor of the cheque; and
send, via the communications module and to a client device associated with the payor of the cheque, a notification indicating that the cheque has been submitted for collection.

* * * * *